United States Patent
Mori (10) Patent No.: US 11,150,642 B2
(45) Date of Patent: Oct. 19, 2021

(54) REMOTE VEHICLE CONTROL SYSTEM UTILIZING SYSTEM STATE INFORMATION MATCHING AND CORRECTING

(71) Applicant: HONDA MOTOR CO., LTD., Tokyo (JP)

(72) Inventor: Takashi Mori, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 209 days.

(21) Appl. No.: 16/365,603

(22) Filed: Mar. 26, 2019

(65) Prior Publication Data

US 2019/0302756 A1 Oct. 3, 2019

(30) Foreign Application Priority Data

Mar. 27, 2018 (JP) .............................. JP2018-060647

(51) Int. Cl.
*G05D 1/00* (2006.01)
*B60W 50/14* (2020.01)

(52) U.S. Cl.
CPC ........... *G05D 1/0016* (2013.01); *B60W 50/14* (2013.01); *G05D 1/0022* (2013.01); *B60W 2050/146* (2013.01); *G05D 2201/0213* (2013.01)

(58) Field of Classification Search
CPC ............... G05D 1/0016; G05D 1/0022; G05D 2201/0213; G05D 1/005; B60W 50/14; B60W 2050/146
See application file for complete search history.

(56) References Cited

U.S. PATENT DOCUMENTS

| | | | | |
|---|---|---|---|---|
| 2018/0136649 A1* | 5/2018 | Phillips | ................ | G05D 1/0038 |
| 2019/0265710 A1* | 8/2019 | Kaneko | ................ | B60W 40/08 |
| 2019/0302761 A1* | 10/2019 | Huang | ................ | G02B 27/017 |
| 2019/0383624 A1* | 12/2019 | Magzimof | ........... | H04B 17/373 |
| 2019/0384286 A1* | 12/2019 | Muenster | ................ | B60K 28/06 |
| 2020/0004240 A1* | 1/2020 | Biehler | ................ | G05D 1/0212 |
| 2021/0116907 A1* | 4/2021 | Altman | ............. | B60W 60/0015 |

FOREIGN PATENT DOCUMENTS

| | | | | |
|---|---|---|---|---|
| JP | 2000311299 A | | 11/2000 | |
| JP | 2004206218 A | | 7/2004 | |
| JP | 2018060450 A | * | 4/2018 | ............... G05D 1/02 |
| WO | WO2017125788 A | * | 7/2017 | ............... G05D 1/00 |

OTHER PUBLICATIONS

Shuyuan Xing, Tao Jiang; "Research on realization of forcefeedback of vehicle remote control station steering simulation system"; Jun. 25, 2017, DOI.org, Whole Paper. (Year: 2017).*

* cited by examiner

*Primary Examiner* — Peter D Nolan
*Assistant Examiner* — Kenneth M Dunne (57) ABSTRACT

An information processing apparatus is provided. The information processing apparatus includes: a first equipment state information acquiring unit that acquires first equipment state information indicating a state of equipment of a remotely driven vehicle which is to be remotely driven; and a control unit that controls a remotely driving apparatus that is to remotely drive the remotely driven vehicle, the control being performed based on the first equipment state information and second equipment state information indicating a state of equipment of the remotely driving apparatus.

15 Claims, 10 Drawing Sheets

|  | REMOTELY DRIVEN VEHICLE 510 | REMOTELY DRIVING APPARATUS 520 |
|---|---|---|
| STEERING | 50 DEGREES COUNTERCLOCKWISE | INITIAL POSITION |
| SHIFT LEVER | P | P |
| LIGHT SWITCH | ON | OFF |
| BLINKER SWITCH | OFF | OFF |
| ⋮ | ⋮ | ⋮ |

REMOTE VEHICLE CONTROL SYSTEM UTILIZING SYSTEM STATE INFORMATION MATCHING AND CORRECTING

The contents of the following Japanese patent application are incorporated herein by reference: NO. 2018-060647 filed on Mar. 27, 2018.

BACKGROUND

1. Technical Field

The present invention relates to an information processing apparatus, and a computer readable storage medium.

2. Related Art

Techniques for an electrically powered vehicle to remotely drive other vehicles or for a remotely driving apparatus for remote driving to remotely drive vehicles are known (see Patent Literatures 1, 2, for example).

PRIOR ART LITERATURES

Patent Literatures

[Patent Literature 1] Japanese Patent Application Publication No. 2000-311299
[Patent Literature 2] Japanese Patent Application Publication No. 2004-206218

When remote driving of a remotely driven vehicle is started by a remotely driving apparatus, malfunctions occur in some cases unless the state of equipment of the remotely driving apparatus, and the state of equipment of the remotely driven vehicle are matching.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
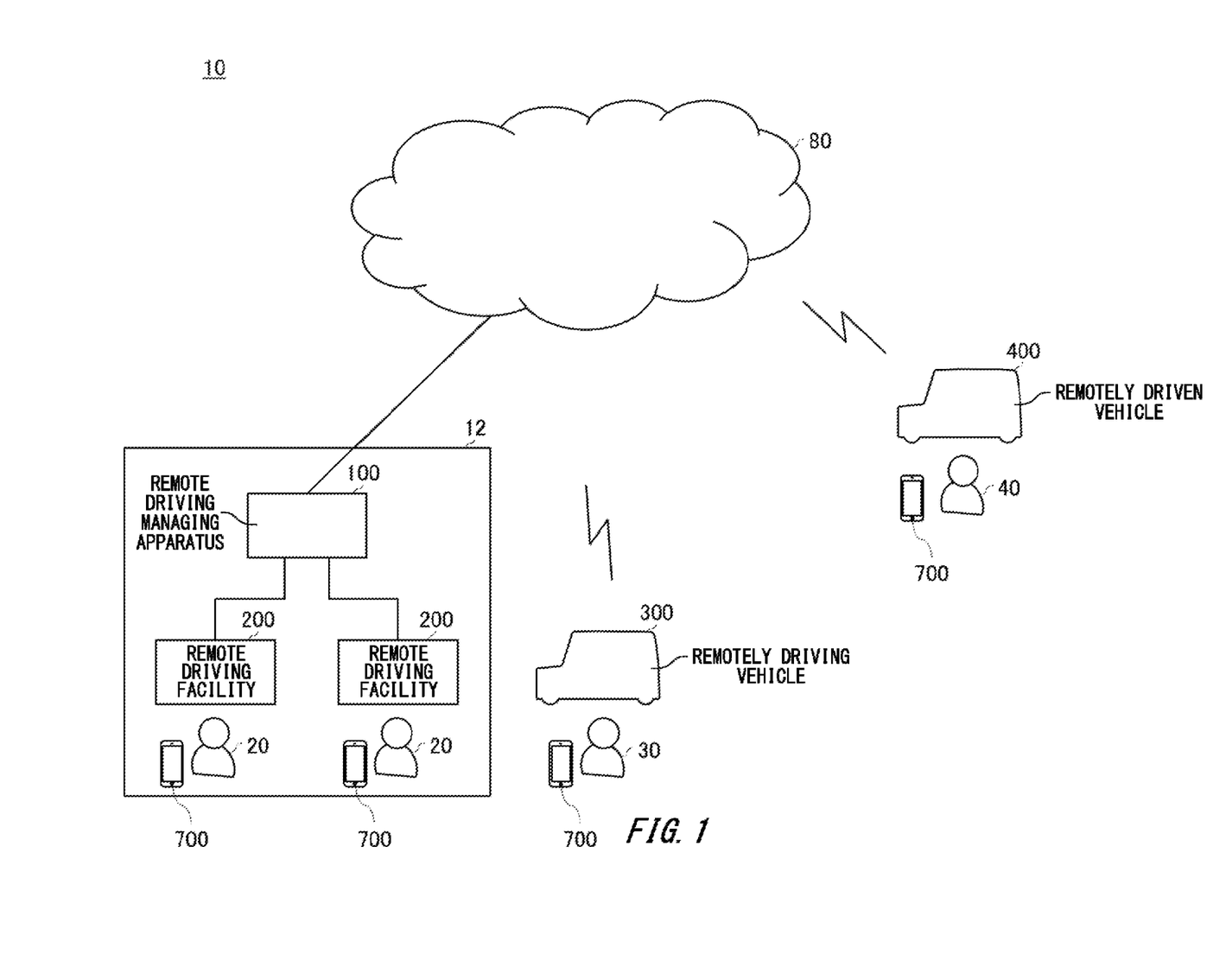
FIG. 1 schematically illustrates an exemplary remote driving system 10.

FIG. 1 schematically illustrates an exemplary remote driving system 10. The remote driving system 10 includes a remote driving management center 12, a remotely driving vehicle 300, and a remotely driven vehicle 400. Although one remotely driving vehicle 300 is illustrated as an example in FIG. 1, the number of remotely driving vehicles 300 may be larger than one. In addition, although one remotely driven vehicle 400 is illustrated as an example in FIG. 1, the number of remotely driven vehicles 400 may be larger than one. The remote driving management center 12 includes a remote driving managing apparatus 100, and a plurality of remote driving facilities 200. Although two remote driving facilities 200 are illustrated as an example in FIG. 1, the number of remote driving facilities 200 may be three or larger.

The remote driving facilities 200 are facilities for remotely driving remotely driven vehicles 400 via a network 80. The network 80 may be any network, and for example the network 80 may include at least one of the Internet, a mobile phone network such as a so-called 3G (3rd Generation), LTE (Long Term Evolution), 4G (4th Generation), or 5G (5th Generation) network, a public wireless LAN (Local Area Network), and a private network.

The remote driving facilities 200 are facilities created to simulate driver's seats of cars, for example. A remote driving facility 200 has a manipulating unit that accepts manipulation by a driver 20 to remotely drive a remotely driven vehicle 400, and a communication unit that transmits, to the remotely driven vehicle 400, a signal corresponding to manipulation of the manipulating unit. The remote driving facility 200 is an exemplary remotely driving apparatus. The driver 20 is an exemplary remote driver. The manipulating unit includes equipment necessary for driving a vehicle such as a wheel, an accelerator pedal, a brake pedal, a shift lever, or a blinker lever. In addition, the manipulating unit may further include equipment for manipulating a car navigation system, an air conditioner, audio equipment, slide doors, a sunroof, a seat heater, or the like. The communication unit receives images of an environment around a remotely driven vehicle 400 that are captured by image-capturing units provided to the remotely driven vehicle 400. The remote driving facility 200 has a display unit that displays the images of the environment around the remotely driven vehicle 400 received by the communication unit. The driver 20 manipulates the manipulating unit while viewing the images displayed on the display unit to thereby realize remote driving of the remotely driven vehicle 400.

The remotely driving vehicle 300 is a car with a remote driving function to remotely drive a remotely driven vehicle 400 via the network 80. The remotely driving vehicle 300 may be able to be driven by manipulation of a manipulating unit provided to the remotely driving vehicle 300 (which driving is referred to as manual driving in some cases). In addition, the remotely driving vehicle 300 may support so-called automated driving.

The remotely driving vehicle 300 has a manipulating unit that accepts manipulation by a driver 30, and a communication unit that communicates with a remotely driven vehicle 400 and the remote driving managing apparatus 100. The remotely driving vehicle 300 is an exemplary remotely driving apparatus. The driver 30 is an exemplary remote driver. The manipulating unit includes equipment necessary for driving a vehicle such as a wheel, an accelerator pedal, a brake pedal, a shift lever, or a blinker lever. In addition, the manipulating unit may further include equipment for manipulating an air conditioner, audio equipment, a car navigation system, slide doors, a sunroof, a seat heater, or the like. The communication unit receives images of an environment around a remotely driven vehicle 400 that are captured by image-capturing units provided to the remotely driven vehicle 400. The remotely driving vehicle 300 has a display unit that displays the images of the environment around the remotely driven vehicle 400 received by the communication unit. The remotely driving vehicle 300 for example supports a manual driving mode and a remotely driving mode. In the manual driving mode, the remotely driving vehicle 300 travels according to manipulation of the manipulating unit, and in the remotely driving mode, the remotely driving vehicle 300 transmits, to the remotely driven vehicle 400, signals according to manipulation of the manipulating unit. The driver 30 remotely drives the remotely driven vehicle 400 by switching the mode of the remotely driving vehicle 300 parked in a parking space at home to the remotely driving mode, for example.

The remotely driven vehicle 400 is a car supporting remote driving by a remote driving facility 200 or the remotely driving vehicle 300. In addition to supporting remote driving, the remotely driven vehicle 400 may support manual driving, and may support automated driving. When in the remote driving mode, the remotely driven vehicle 400 travels according to signals received from a remote driving facility 200 or the remotely driving vehicle 300. When in the automated driving mode, the remotely driven vehicle 400 performs travelling, stopping, turning, and so on of itself without being dependent on steering, accelerator pedal manipulation, brake pedal manipulation, gear shift manipulation, and so on by a driver, using apparatuses such as image-capturing units or radars provided to the remotely driven vehicle 400, and positional information and map information.

The remote driving managing apparatus 100 manages remote driving of the remotely driven vehicle 400 by a remotely driving apparatus. If the remote driving managing apparatus 100 receives request information requesting remote driving from the remotely driven vehicle 400, the remote driving managing apparatus 100 determines, from a plurality of remotely driving apparatuses, a remotely driving apparatus that is to be caused to execute remote driving of the remotely driven vehicle 400.

If the remote driving managing apparatus 100 determined a remotely driving apparatus that is to be caused to execute remote driving of the remotely driven vehicle 400, the remote driving managing apparatus 100 controls the remotely driving apparatus based on equipment state information indicating the state of equipment of the remotely driven vehicle 400, and equipment state information indicating the state of equipment of the remotely driving apparatus. The remote driving managing apparatus 100 is an exemplary information processing apparatus.

The remote driving managing apparatus 100 controls the remotely driving apparatus such that the state of equipment of the remotely driving apparatus matches the state of equipment of the remotely driven vehicle 400, for example. As a specific example, if the steering angle of the steering of the remotely driving apparatus is different from the steering angle of the steering of the remotely driven vehicle 400, the remote driving managing apparatus 100 controls the remotely driving apparatus such that the steering angle of the steering of the remotely driving apparatus matches the steering angle of the steering of the remotely driven vehicle 400. For example, if remote driving is started in the state where the steering of the remotely driven vehicle 400 is fully turned counterclockwise, and the steering angle of the steering of the remotely driving apparatus is zero, this results in a situation where the remotely driven vehicle 400 turns left although the remote driver intends to make the remotely driven vehicle 400 drive straight. In contrast tot his, it becomes possible with the remote driving managing apparatus 100 according to the present embodiment to make the steering angles of the steering matched before remote driving of the remotely driven vehicle 400 by the remotely driving apparatus starts.

In addition, the remote driving managing apparatus 100 issues a warning to the remote driver for example if the state of equipment of the remotely driving apparatus is judged as not matching the state of equipment of the remotely driven vehicle 400. The remote driving managing apparatus 100 transmits warning information to the remotely driving apparatus, for example. In addition, the remote driving managing apparatus 100 transmits warning information to a communication terminal 700 corresponding to the remote driver, for example. The communication terminal 700 corresponding to the remote driver may be a mobile phone such as a smart phone owned by the remote driver, a tablet terminal, or the like, for example. Thereby, it is possible to let the remote driver know that the state of equipment of the remotely driving apparatus and the state of equipment of the remotely driven vehicle 400 are not matching.

Figure 2:
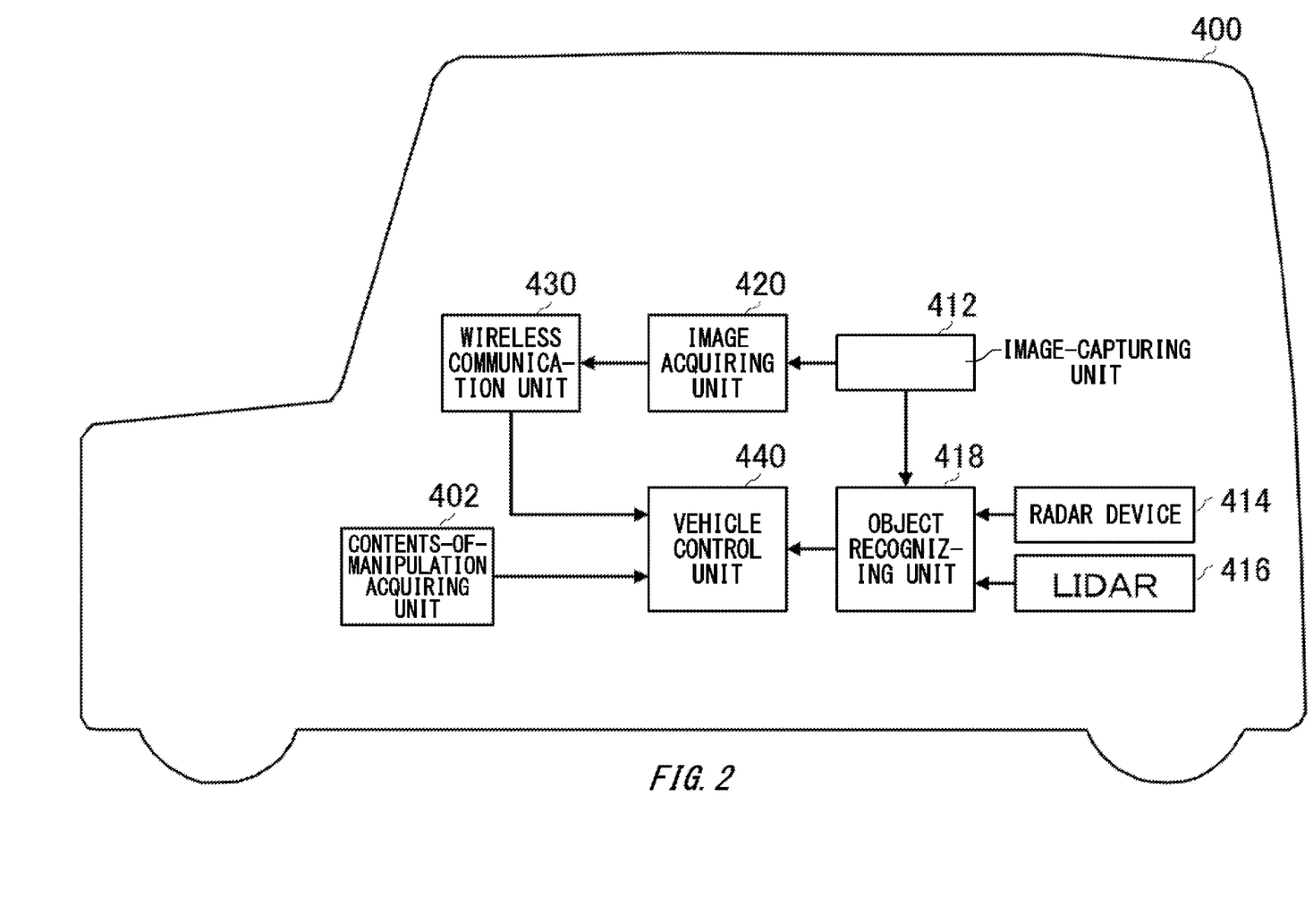
FIG. 2 schematically illustrates an exemplary functional configuration of a remotely driven vehicle 400.

FIG. 2 schematically illustrates an exemplary functional configuration of the remotely driven vehicle 400. The remotely driven vehicle 400 includes a contents-of-manipulation acquiring unit 402, an image-capturing unit 412, a radar device 414, a LIDAR 416, an object recognizing unit 418, an image acquiring unit 420, a wireless communication unit 430, and a vehicle control unit 440.

The contents-of-manipulation acquiring unit 402 acquires contents of manipulation of a manipulating unit provided to the remotely driven vehicle 400. For example, the contents-of-manipulation acquiring unit 402 acquires a steering angle of the steering, a pedal pressure manipulation amount of an accelerator pedal, a pedal pressure manipulation amount of a brake pedal, or the like.

The image-capturing unit 412 for example is a digital camera utilizing a solid-state image sensor such as a CCD (Charge Coupled Device), a CMOS (Complementary Metal Oxide Semiconductor), or the like. The image-capturing unit 412 includes one or more image-capturing units that are attached to predetermined locations of the remotely driven vehicle 400. If an image of a space in front of the remotely driven vehicle 400 is to be captured, an image-capturing unit 412 is attached to a front windshield upper portion, a room mirror rear surface, or the like. An image-capturing unit 412 captures an image of an environment around the remotely driven vehicle 400 periodically repeatedly, for example. An image-capturing unit 412 may be a stereo camera.

The radar device 414 radiates radio waves such as millimeter waves around the remotely driven vehicle 400, and senses radio waves reflected on objects (reflected waves) to sense at least positions (distances, and azimuths) of the objects. The radar device 414 includes one or more radar devices that are attached to predetermined locations of the remotely driven vehicle 400. The radar device 414 may sense the position and speed of an object by an FM-CW (Frequency Modulated Continuous Wave) method.

The LIDAR 416 irradiates an environment around the remotely driven vehicle 400 with light, and measures scattered light. The LIDAR 416 senses the distance to a target based on a length of time that elapses from light-emission until light-reception. Light used for the irradiation is pulsed laser light, for example. The LIDAR 416 includes one or more LIDARs that are attached to predetermined locations of the remotely driven vehicle 400.

The object recognizing unit 418 recognizes the position, type, speed or the like of an object based on results of sensing by some or all of the image-capturing unit 412, radar device 414, and LIDAR 416. The object recognizing unit 418 outputs a result of the recognition to the vehicle control unit 440. In addition, the object recognizing unit 418 may output results of sensing by the image-capturing unit 412, radar device 414, and LIDAR 416 to the vehicle control unit 440 directly without modification as necessary.

The image acquiring unit 420 acquires images captured by the image-capturing unit 412. The wireless communication unit 430 wirelessly communicates with the remote driving managing apparatus 100, a remote driving facility 200, and the remotely driving vehicle 300 via the network 80. If the remotely driven vehicle 400 is in the remotely driven mode, the wireless communication unit 430 transmits images acquired by the image acquiring unit 420 to the remote driving managing apparatus 100, a remote driving facility 200, or the remotely driving vehicle 300. In addition, if the remotely driven vehicle 400 is in the remotely driven mode, the wireless communication unit 430 receives signals for remote driving from the remote driving managing apparatus 100, a remote driving facility 200, or the remotely driving vehicle 300, and outputs the signals to the vehicle control unit 440.

The vehicle control unit 440 controls the remotely driven vehicle 400. The vehicle control unit 440 may have a position acquiring unit that acquires the position of the remotely driven vehicle 400. The position acquiring unit receives positional information about the remotely driven vehicle 400 from a navigation apparatus provided to the remotely driven vehicle 400, for example. The navigation apparatus of the remotely driven vehicle 400 has a GNSS (Global Navigation Satellite System) receiver, for example, and the GNSS receiver locates the position of the remotely driven vehicle 400 based on signals received from the GNSS satellite. Note that a GNSS receiver may be provided to the position acquiring unit.

The vehicle control unit 440 may acquire destination information indicating a destination of the remotely driven vehicle 400, and path information indicating a path of movement to the destination. The vehicle control unit 440 acquires the destination information and path information from the navigation apparatus provided to the remotely driven vehicle 400, for example.

The vehicle control unit 440 acquires first map information including at least map information about the path of movement indicated by the path information. The vehicle control unit 440 receives the first map information from the navigation apparatus of the remotely driven vehicle 400, for example. In addition, the vehicle control unit 440 may receive the first map information via the network 80 from a map management server that manages map information about each geographic location. The first map information is, for example, information in which road shapes are represented by links indicating roads, and nodes connected by the links. The first map information may include the curvatures of roads, POI (Point Of Interest) information, or the like. The first map information may be updated at any time.

The vehicle control unit 440 may further acquire second map information including at least map information about the path of movement indicated by the path information. Similar to the first map information, the vehicle control unit 440 may receive the second map information from the navigation apparatus of the remotely driven vehicle 400, or may receive the second map information via the network 80. The second map information is map information more precise than the first map information. The second map information includes, for example, information about the middles of lanes, information about the boundaries between lanes, or the like. In addition, the second map information may include road information, traffic regulation information, or the like. The second map information may be updated at any time.

If the remotely driven vehicle 400 is in the automated driving mode, the vehicle control unit 440 may use the position acquired by the position acquiring unit, the information received from the object recognizing unit 418, and the first map information to control travelling of the remotely driven vehicle 400. The vehicle control unit 440 may further use the second map information to control travelling of the remotely driven vehicle 400. If the remotely driven vehicle 400 is in the manual driving mode, the vehicle control unit 440 may control travelling of the remotely driven vehicle 400 according to contents of manipulation acquired by the contents-of-manipulation acquiring unit 402.

If the remotely driven vehicle 400 is in the remotely driven mode, the vehicle control unit 440 controls travelling of the remotely driven vehicle 400 according to signals that the wireless communication unit 430 receives from the remote driving managing apparatus 100, a remote driving facility 200, or the remotely driving vehicle 300.

Figure 3:
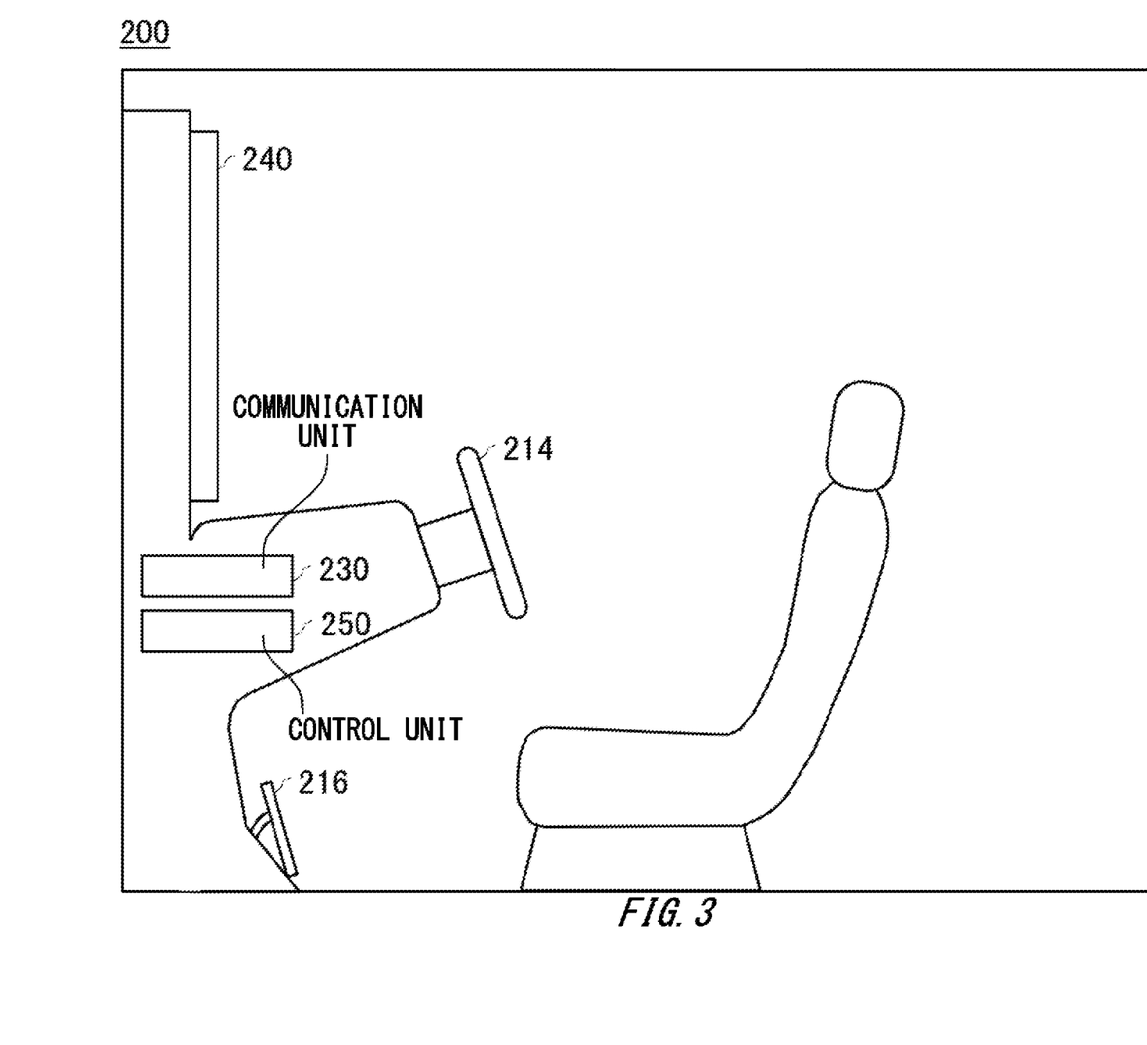
FIG. 3 schematically illustrates an exemplary remote driving facility 200.

FIG. 3 schematically illustrates an exemplary remote driving facility 200. In FIG. 3, illustration of equipment other than a wheel 214 and a pedal 216 is omitted.

The remote driving facility 200 includes a communication unit 230, a display unit 240, and a control unit 250. The communication unit 230 communicates with the remote driving managing apparatus 100. In addition, the communication unit 230 communicates with the remotely driven vehicle 400. The communication unit 230 may communicate with the remotely driven vehicle 400 via the remote driving managing apparatus 100. In addition, the communication unit 230 may communicate with the remotely driven vehicle 400 via the network 80, but not via the remote driving managing apparatus 100.

The communication unit 230 receives an image transmitted by the wireless communication unit 430 of the remotely driven vehicle 400. The display unit 240 displays the image that the communication unit 230 received from the remotely driven vehicle 400. Note that, instead of the display unit 240, the remote driving facility 200 may include a projector and a screen, and in this case the projector may project the image received by the communication unit 230 onto the screen.

The control unit 250 acquires contents of manipulation of the equipment of the remote driving facility 200, and causes the communication unit 230 to transmit signals indicating the contents of manipulation to the remotely driven vehicle 400. The control unit 250 causes the communication unit 230 to transmit a steering angle of the steering, a pedal pressure manipulation amount of the pedal 216, or the like, for example.

If a manipulation instruction instructing manipulation of the equipment of the remote driving facility 200 is received from the remote driving managing apparatus 100, the control unit 250 manipulates the equipment of the remote driving facility 200 following the manipulation instruction.

For example, if a manipulation instruction instructing to make the steering angle of the steering the maximum angle in the counterclockwise direction is received, the control unit 250 rotates the wheel 214 so as to make the steering angle of the steering the maximum angle in the counterclockwise direction.

Figure 4:
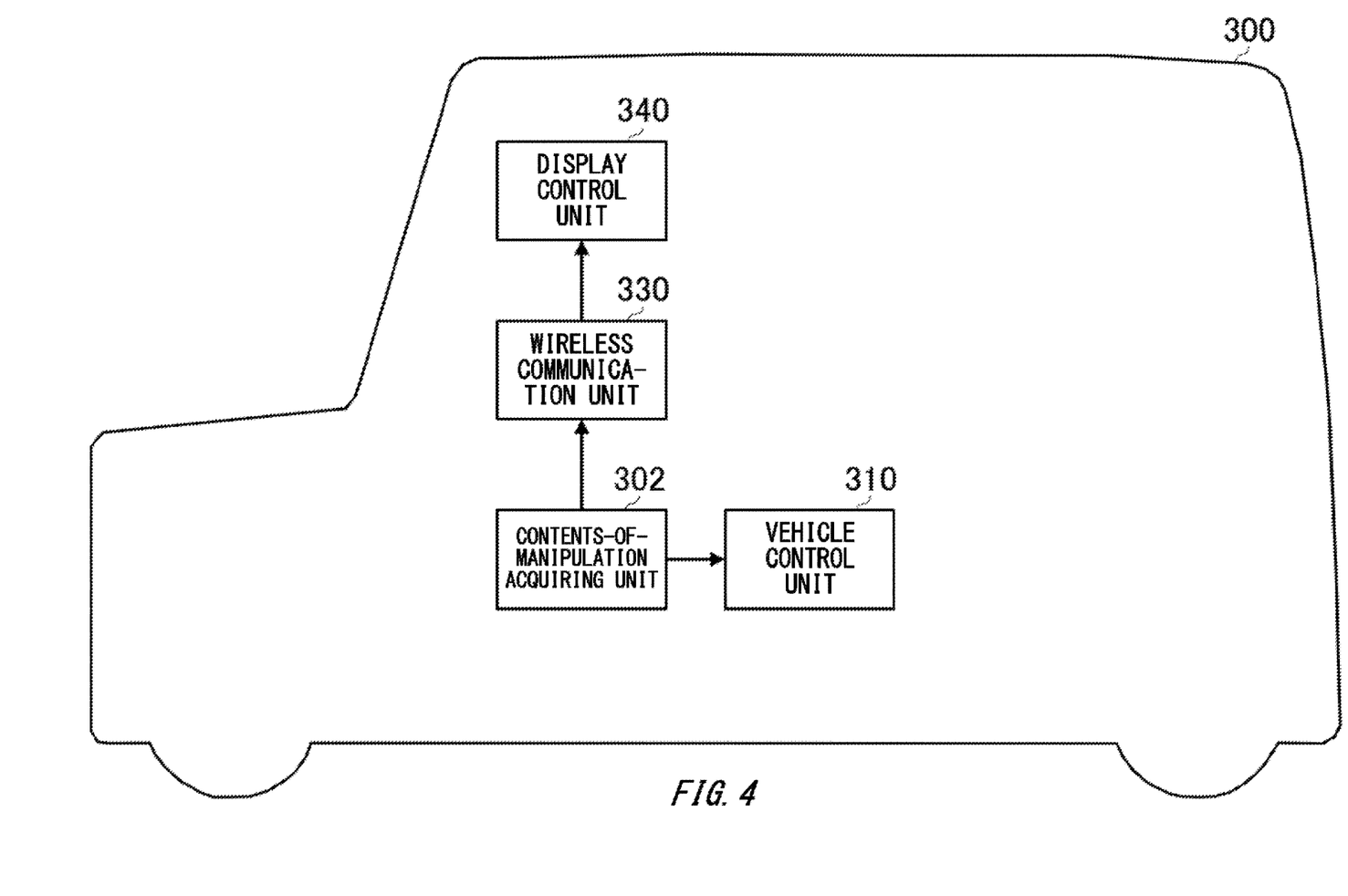
FIG. 4 schematically illustrates an exemplary functional configuration of a remotely driving vehicle 300.

FIG. 4 schematically illustrates an exemplary functional configuration of the remotely driving vehicle 300. The remotely driving vehicle 300 includes a contents-of-manipulation acquiring unit 302, a vehicle control unit 310, a wireless communication unit 330, and a display control unit 340.

The contents-of-manipulation acquiring unit 302 acquires contents of manipulation of a manipulating unit provided to the remotely driving vehicle 300. For example, the contents-of-manipulation acquiring unit 302 acquires a steering angle of the steering, a pedal pressure manipulation amount of an accelerator pedal, a pedal pressure manipulation amount of a brake pedal, or the like.

If the remotely driving vehicle 300 is in the manual driving mode, the contents-of-manipulation acquiring unit 302 outputs signals indicating the acquired contents of manipulation to the vehicle control unit 310. The vehicle control unit 310 controls the remotely driving vehicle 300 according to the signals acquired from the contents-of-manipulation acquiring unit 302. If the remotely driving vehicle 300 is in the remotely driving mode, the contents-of-manipulation acquiring unit 302 outputs the acquired contents of manipulation to the wireless communication unit 330. The wireless communication unit 330 transmits the signals acquired from the contents-of-manipulation acquiring unit 302 to the remotely driven vehicle 400 via the network 80.

If the remotely driving vehicle 300 is in the remotely driving mode, the wireless communication unit 330 receives images transmitted by the wireless communication unit 430 of the remotely driven vehicle 400, and outputs the images to the display control unit 340. The display control unit 340 causes a display unit provided to the remotely driving vehicle 300 to display the received images.

If a manipulation instruction instructing manipulation of the equipment of the remotely driving vehicle 300 is received from the remote driving managing apparatus 100, the vehicle control unit 310 manipulates the equipment of the remotely driving vehicle 300 following the manipulation instruction. For example, if a manipulation instruction instructing to make the steering angle of the steering the maximum angle in the counterclockwise direction is received, the vehicle control unit 310 rotates the wheel so as to make the steering angle of the steering the maximum angle in the counterclockwise direction.

Figure 5:
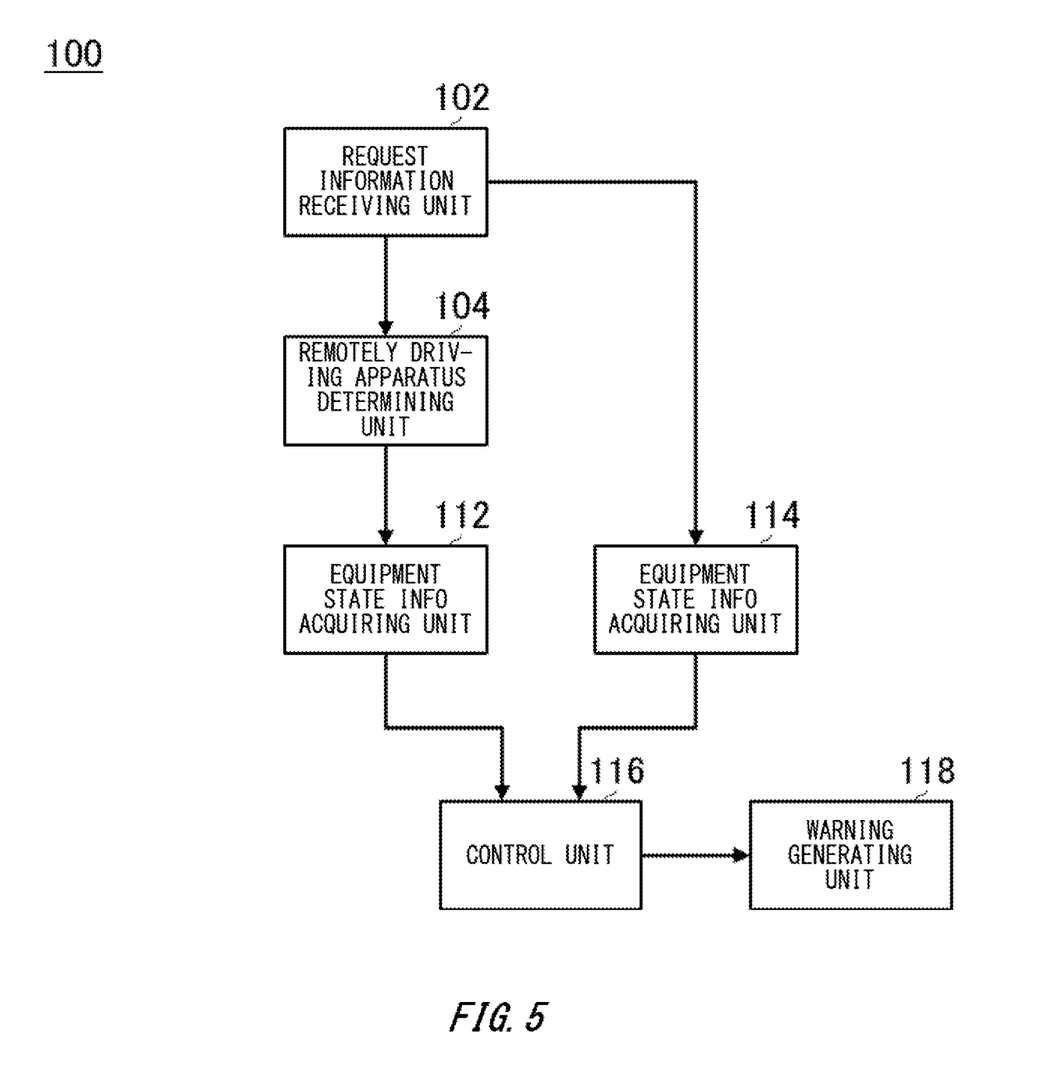
FIG. 5 schematically illustrates exemplary comparison information 500.

FIG. 5 schematically illustrates an exemplary functional configuration of the remote driving managing apparatus 100. The remote driving managing apparatus 100 includes a request information receiving unit 102, a remotely driving apparatus determining unit 104, an equipment state information acquiring unit 112, an equipment state information acquiring unit 114, a control unit 116, and a warning generating unit 118.

The request information receiving unit 102 receives request information requesting remote driving of the remotely driven vehicle 400. The request information includes information identifying the remotely driven vehicle 400, and a time period in which remote driving is desired, for example. The request information receiving unit 102 receives request information from the remotely driven vehicle 400, for example. In addition, the request information receiving unit 102 receives request information from the communication terminal 700 of a driver 40 seated on the driver's seat of the remotely driven vehicle, for example.

The remotely driving apparatus determining unit 104 determines a remotely driving apparatus that is to remotely drive the remotely driven vehicle 400 in response to the request information received by the request information receiving unit 102. The remotely driving apparatus determining unit 104 for example refers to management data for managing an available remote driving time period of each remotely driving apparatus and remote driver, and determines a remotely driving apparatus and a remote driver to remotely drive the remotely driven vehicle 400. The remotely driving apparatus determining unit 104 transmits request information indicating a request to remotely drive the remotely driven vehicle 400 to the determined remotely driving apparatus and remote driver.

The equipment state information acquiring unit 112 acquires equipment state information indicating the state of equipment of the remotely driving apparatus determined by the remotely driving apparatus determining unit 104 (referred to as remotely driving apparatus equipment state information in some cases). The remotely driving apparatus equipment state information may indicate the physical state of equipment of the remotely driving apparatus. For example, the remotely driving apparatus equipment state information indicates the steering angle of the steering of the remotely driving apparatus, the position of the shift lever of the remotely driving apparatus, and the like. The equipment state information acquiring unit 112 receives the equipment state information from the remotely driving apparatus, for example.

The equipment state information acquiring unit 114 acquires equipment state information indicating the state of equipment of the remotely driven vehicle 400 (referred to as remotely driven vehicle equipment state information in some cases). The remotely driven vehicle equipment state information may indicate the physical state of equipment of the remotely driven vehicle 400. For example, the remotely driven vehicle equipment state information indicates the steering angle of the steering of the remotely driven vehicle 400, the position of the shift lever of the remotely driven vehicle 400, and the like. If request information includes remotely driven vehicle equipment state information also, the equipment state information acquiring unit 114 acquires the remotely driven vehicle equipment state information included in the request information. If request information does not include remotely driven vehicle equipment state information, the equipment state information acquiring unit 114 receives the remotely driven vehicle equipment state information from the remotely driven vehicle 400, for example.

The control unit 116 controls the remotely driving apparatus based on the remotely driving apparatus equipment state information and remotely driven vehicle equipment state information. The control unit 116 controls the remotely driving apparatus such that the state of equipment of the remotely driving apparatus matches the state of equipment of the remotely driven vehicle 400, for example.

In addition, the control unit 116 permits remote driving of the remotely driven vehicle 400 by the remotely driving apparatus under the condition that the state of equipment of the remotely driving apparatus is matching the state of equipment of the remotely driven vehicle 400, for example. That is, the control unit 116 does not permit remote driving of the remotely driven vehicle 400 by the remotely driving apparatus if the state of equipment of the remotely driving apparatus is not matching the state of equipment of the remotely driven vehicle 400.

The warning generating unit 118 generates a warning if the state of equipment of the remotely driving apparatus is judged as not matching the state of equipment of the remotely driven vehicle 400. The warning generating unit 118 transmits, to at least one of the remotely driving apparatus and the communication terminal 700 of the remote driver, warning information indicating that the state of equipment of the remotely driving apparatus is not matching the state of equipment of the remotely driven vehicle 400, for example. The warning generating unit 118 may transmit warning information that enables identification of a piece of equipment that is included in a plurality of pieces of the equipment of the remotely driving apparatus, and the state of which is not matching the state of equipment of the remotely driven vehicle 400. For example, if the steering angles of the steering are not matching, the warning generating unit 118 transmits warning information indicating that the steering angles of the steering are not matching. In addition, the warning generating unit 118 may transmit warning information including contents of manipulation necessary for making the states matched. For example, if the steering angles of the steering are not matching, the warning generating unit 118 transmits warning information including the rotation amount and rotation direction of the wheel necessary for the steering angles of the steering to match.

Figure 6:
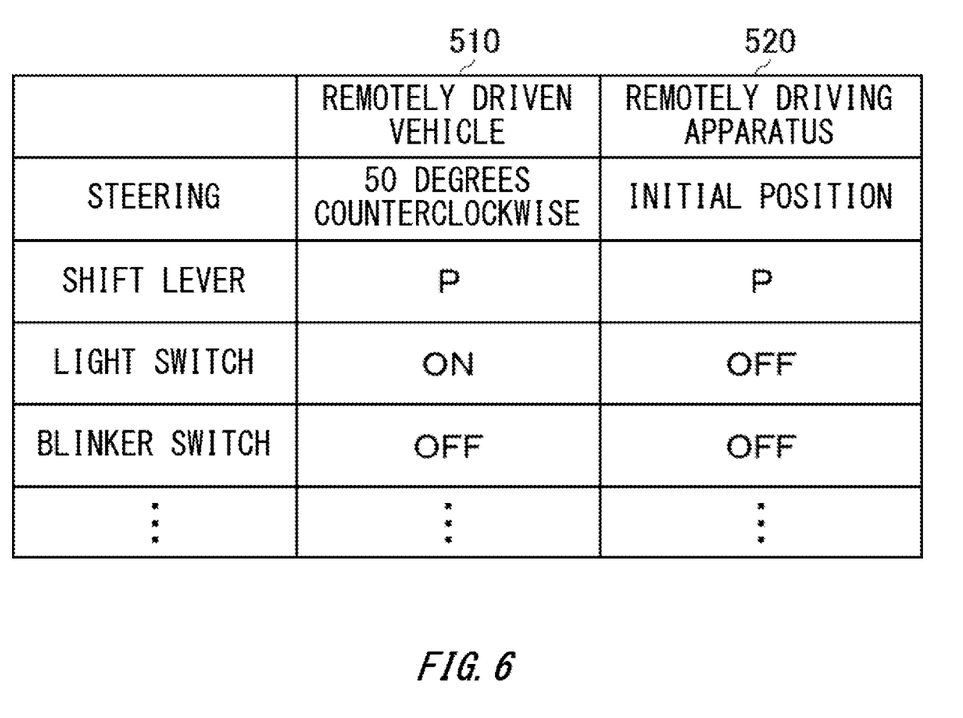
FIG. 6 schematically illustrates an exemplary functional configuration of a remote driving managing apparatus 100.

FIG. 6 schematically illustrates exemplary remotely driven vehicle equipment state information 510 and remotely driving apparatus equipment state information 520. According to the remotely driven vehicle equipment state information 510 illustrated in FIG. 6, the steering angle of the steering of the remotely driven vehicle 400 is 50 degrees in the counterclockwise direction, the shift lever is at P, the light switch is turned on, and the blinker switch is turned off. In addition, according to the remotely driving apparatus equipment state information 520 illustrated in FIG. 6, the steering angle of the steering of the remotely driving apparatus is at its initial position, the shift lever is at P, the light switch is turned off, and the blinker switch is turned off. The states of the steering angles of the steering and light switches are different between the remotely driven vehicle 400 and the remotely driving apparatus. In the situation illustrated in FIG. 6, the control unit 116 of the remote driving managing apparatus 100 controls the remotely driving apparatus such that the steering angle of the steering of the remotely driving apparatus is turned by 50 degrees in the counterclockwise direction, and the light switch is turned on, for example.

Figure 7:
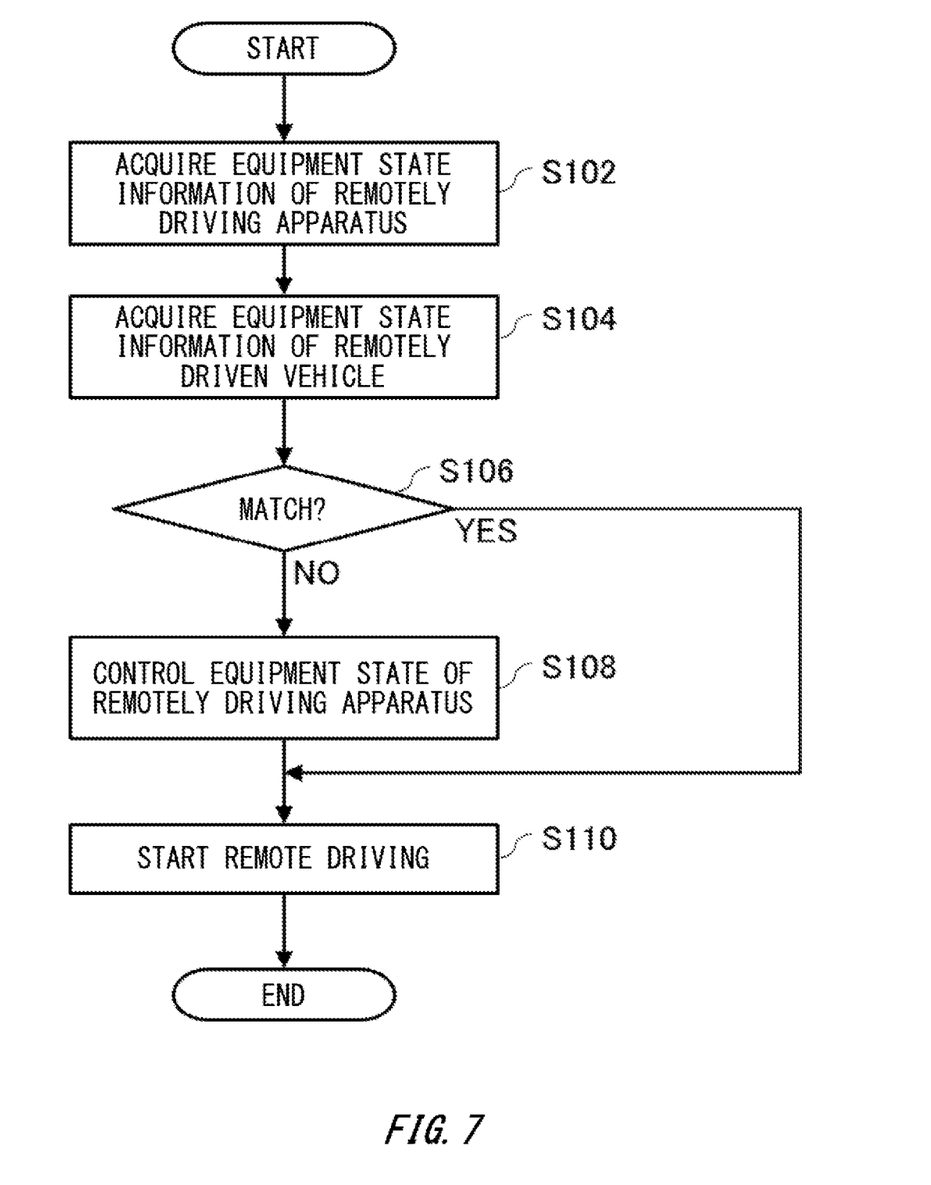
FIG. 7 schematically illustrates an exemplary flow of processes to be performed by the remote driving managing apparatus 100.

FIG. 7 schematically illustrates an exemplary flow of processes to be performed by the remote driving managing apparatus 100. The processes illustrated in FIG. 7 are explained as being started in the state where a remotely driving apparatus that is to remotely drive the remotely driven vehicle 400 has been determined. Each process illustrated in FIG. 7 is executed by a control unit provided to the remote driving managing apparatus 100 on its own initiative.

At Step (steps are abbreviated to S's in some cases) 102, the equipment state information acquiring unit 112 acquires remotely driving apparatus equipment state information. At S104, the equipment state information acquiring unit 114 acquires remotely driven vehicle equipment state information.

At S106, the control unit 116 judges whether or not the state of equipment of the remotely driving apparatus is matching the state of equipment of the remotely driven apparatus. The control unit 116 may judge whether or not the state of all the pieces of the equipment of the remotely driving apparatus match the state of equipment of the remotely driven apparatus. In addition, the control unit 116 may judge whether or not the state of a predetermined piece of equipment among the pieces of the equipment of the remotely driving apparatus is matching the state of equipment of the remotely driven apparatus. The predetermined piece of equipment may be a piece of equipment that is set as a piece of equipment that may cause a problem in remote driving if the state of the predetermined piece of equipment of the remotely driving apparatus is not matching the state of equipment of the remotely driven apparatus, for example. In addition, the predetermined piece of equipment may be a piece of equipment set by an operator of the remote driving managing apparatus 100 or the like, for example.

If it is judged at S106 that the states are not matching, the process proceeds to S108, and if the states are judged as matching, the process proceeds to S110. At S108, the control unit 116 controls the remotely driving apparatus such that the state of equipment of the remotely driving apparatus matches the state of equipment of the remotely driven vehicle 400. At S110, remote driving of the remotely driven vehicle 400 by the remotely driving apparatus is started.

Figure 8:
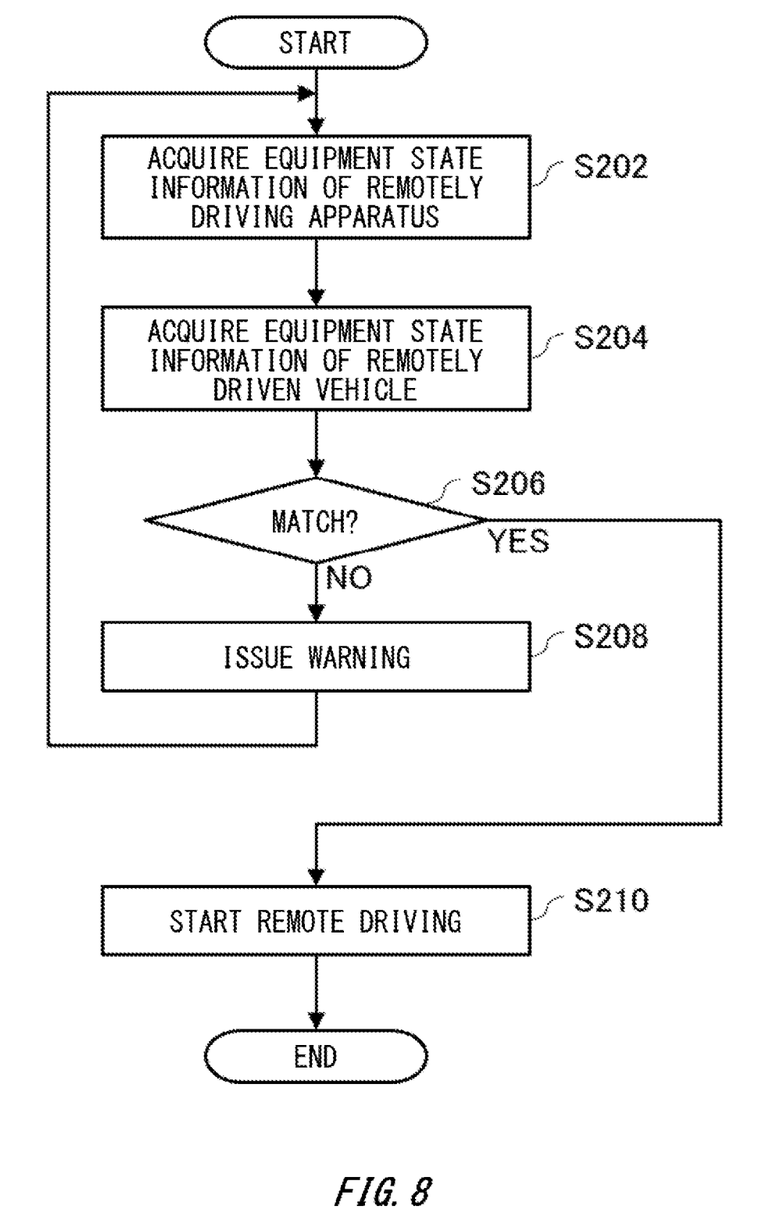
FIG. 8 schematically illustrates an exemplary flow of processes to be performed by the remote driving managing apparatus 100.

FIG. 8 schematically illustrates an exemplary flow of processes to be performed by the remote driving managing apparatus 100. The processes illustrated in FIG. 8 are explained as being started in the state where a remotely driving apparatus that is to remotely drive the remotely driven vehicle 400 has been determined. Each process illustrated in FIG. 8 is executed by the control unit provided to the remote driving managing apparatus 100 on its own initiative.

At S202, the equipment state information acquiring unit 112 acquires equipment state information about the remotely driving apparatus. At S204, the equipment state information acquiring unit 114 acquires equipment state information about the remotely driven vehicle 400.

At S206, the control unit 116 judges whether or not the state of equipment of the remotely driving apparatus is matching the state of equipment of the remotely driven apparatus. The control unit 116 may perform the judgement in a similar manner to that at S106.

If it is judged at S206 that the states are not matching, the process proceeds to S208, and if the states are judged as matching, the process proceeds to S210. At S208, the warning generating unit 118 generates a warning. Then, the process returns to S202. At S210, remote driving of the remotely driven vehicle 400 by the remotely driving apparatus is started.

Although in the above-mentioned embodiment explained, control of the remotely driving apparatus based on the remotely driven vehicle equipment state information and the remotely driving apparatus equipment state information is executed by the remote driving managing apparatus 100, this is not the sole example, and the control may be performed by a control apparatus provided to a remote driving facility 200, and having the communication unit 230, and the control unit 250. In addition, the control may be performed by a control apparatus provided to the remotely driving vehicle 300, and having the contents-of-manipulation acquiring unit 302, vehicle control unit 310, wireless communication unit 330, and display control unit 340.

Figure 9:
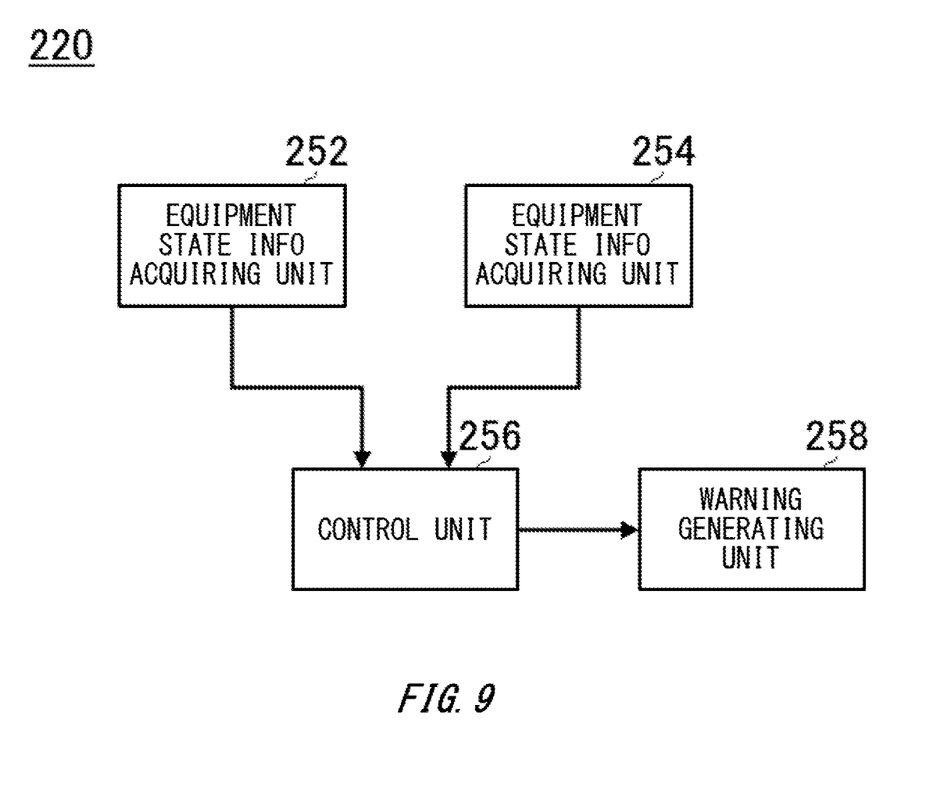
FIG. 9 schematically illustrates an exemplary functional configuration of a control apparatus 220.

FIG. 9 schematically illustrates an exemplary functional configuration of the control apparatus 220 provided to a remote driving facility 200 that is used if the comparison between the equipment state information of the remotely driven vehicle 400 and the equipment state information of the remotely driving apparatus is performed by the control apparatus 220. The control apparatus 220 includes an equipment state information storage unit 252, an equipment state information acquiring unit 254, a control unit 256, and a warning generating unit 258. Here, differences from the equipment state information acquiring unit 114, control unit 116, and warning generating unit 118 are explained mainly.

The equipment state information storage unit 252 stores remotely driving apparatus equipment state information. The equipment state information acquiring unit 254 acquires remotely driven vehicle equipment state information. The equipment state information acquiring unit 254 receives the remotely driven vehicle equipment state information from the remotely driven vehicle 400, for example.

The control unit 256 controls the remote driving facility 200 based on the remotely driving apparatus equipment state information and remotely driven vehicle equipment state information. The control unit 256 controls the remote driving facility 200 such that the state of equipment of the remote driving facility 200 matches the state of equipment of the remotely driven vehicle 400, for example.

In addition, the control unit 256 starts remote driving of the remotely driven vehicle 400 under the condition that the state of equipment of the remote driving facility 200 is matching the state of equipment of the remotely driven vehicle 400, for example. That is, the control unit 256 does not start remote driving of the remotely driven vehicle 400 if the state of equipment of the remote driving facility 200 is not matching the state of equipment of the remotely driven vehicle 400. The warning generating unit 258 generates a warning if the state of equipment of the remote driving facility 200 is judged as not matching the state of equipment of the remotely driven vehicle 400.

If comparison between the equipment state information of the remotely driven vehicle 400 and the equipment state information of the remotely driving apparatus is performed by a control apparatus provided to the remotely driving vehicle 300, the control apparatus may have a functional configuration similar to the functional configuration of the control apparatus 220 illustrated in FIG. 9.

Figure 10:
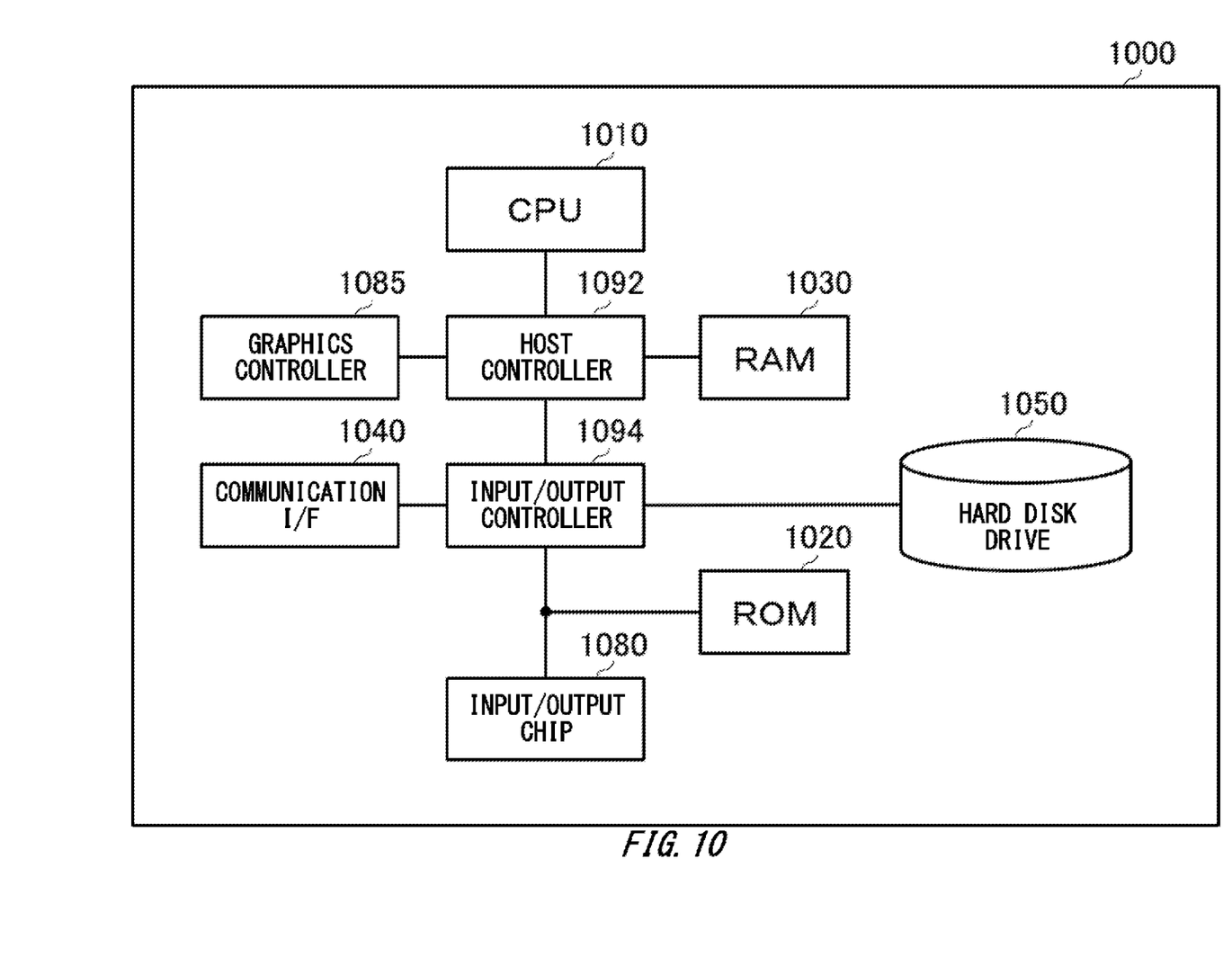
FIG. 10 schematically illustrates an exemplary hardware configuration of a computer 1000 to function as the remote driving managing apparatus 100.

FIG. 10 schematically illustrates an exemplary computer 1000 to function as the remote driving managing apparatus 100. The computer 1000 according to the present embodiment includes: a CPU peripheral unit having a CPU 1010, a RAM 1030, and a graphics controller 1085 that are interconnected by a host controller 1092; and an input/output unit having a ROM 1020, a communication I/F 1040, a hard disk drive 1050, and an input/output chip 1080 that are connected to the host controller 1092 by an input/output controller 1094.

The CPU 1010 performs operations based on programs stored on the ROM 1020 and RAM 1030, and performs control of each unit. The graphics controller 1085 acquires image data generated by the CPU 1010 or the like on a frame buffer provided in the RAM 1030, and displays the image data on a display. Instead of this, the graphics controller 1085 may include therein a frame buffer to store image data generated by the CPU 1010 or the like.

The communication I/F 1040 communicates with another device via a network through a wired or wireless connection. In addition, the communication I/F 1040 functions as hardware to perform communication. The hard disk drive 1050 stores programs and data to be used by the CPU 1010.

The ROM 1020 stores a boot-program to be executed by the computer 1000 at the time of activation and programs or the like that depend on hardware of the computer 1000. The input/output chip 1080 connects various types of input/output devices to the input/output controller 1094 via, for example, a parallel port, a serial port, a keyboard port, a mouse port, and the like.

Programs to be provided to the hard disk drive 1050 via the RAM 1030 are provided by a user in the form stored on a recording medium such as an IC card. The programs are read out from the recording medium, installed on the hard disk drive 1050 via the RAM 1030, and executed at the CPU 1010.

The programs that are installed on the computer 1000, and make the computer 1000 function as the remote driving managing apparatus 100 may act on the CPU 1010 or the like to make the computer 1000 function as each unit of the remote driving managing apparatus 100. Information processing described in these programs are read in by the computer 1000 to thereby function as the request information receiving unit 102, remotely driving apparatus determining unit 104, equipment state information acquiring unit 112, equipment state information acquiring unit 114, control unit 116, and warning generating unit 118, which are specific means attained by cooperation between software and various types of hardware resources mentioned above. Then, with these specific means, the unique remote driving managing apparatus 100 corresponding to a purpose of use of the computer 1000 in the present embodiment can be constructed by realizing operations on or processing of information corresponding to the purpose of use. Similarly, the computer 1000 may function as the control apparatus 220 provided to a remote driving facility 200. In addition, the computer 1000 may function as the control apparatus provided to the remotely driving vehicle 300.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: remote driving system; 12: remote driving management center; 20: driver; 30: driver; 40: driver seated on the driver's seat of a remotely driven vehicle; 80: network; 100: remote driving managing apparatus; 102: request information receiving unit; 104: remotely driving apparatus determining unit; 112: equipment state information acquiring unit; 114: equipment state information acquiring unit; 116: control unit; 118: warning generating unit; 200: remote driving facility; 214: wheel; 216: pedal; 220: control apparatus; 230: communication unit; 240: display unit; 250: control unit; 252: equipment state information storage unit; 254: equipment state information acquiring unit; 256: control unit; 258: warning generating unit; 300: remotely driving vehicle; 302: contents-of-manipulation acquiring unit; 310: vehicle control unit; 330: wireless communication unit; 340: display control unit; 400: remotely driven vehicle; 402: contents-of-manipulation acquiring unit; 412: image-capturing unit; 414: radar device; 416: LIDAR; 418: object recognizing unit; 420: image acquiring unit; 430: wireless communication unit; 440: vehicle control unit; 510: remotely driven vehicle equipment state information; 520: remotely driving apparatus equipment state information; 1000: computer; 1010: CPU; 1020: ROM; 1030: RAM; 1040: communication I/F; 1050: hard disk drive; 1080: input/output chip; 1085: graphics controller; 1092: host controller; 1094: input/output controller

What is claimed is:

1. An information processing apparatus comprising:
a first equipment state information acquiring unit that acquires first equipment state information indicating a state of equipment of a remotely driven vehicle which is to be remotely driven; and
a control unit that controls a remotely driving apparatus that is to remotely drive the remotely driven vehicle, the control being performed based on the first equipment state information and second equipment state information indicating a state of equipment of the remotely driving apparatus, wherein
the control unit judges whether or not a state of predetermined equipment included in the equipment of the remotely driving apparatus is matching the state of equipment of the remotely driven vehicle.

2. The information processing apparatus according to claim 1, wherein the control unit controls the remotely driving apparatus such that the state of equipment of the remotely driving apparatus matches the state of equipment of the remotely driven vehicle.

3. The information processing apparatus according to claim 1, wherein the control unit permits remote driving of the remotely driven vehicle by the remotely driving apparatus under a condition that the state of equipment of the remotely driving apparatus is matching the state of equipment of the remotely driven vehicle.

4. The information processing apparatus according to claim 1, wherein the predetermined equipment is equipment that is set as equipment that causes a problem to the remote driving of the remotely driven vehicle if the state of the remotely driving apparatus and the state of the remotely driven vehicle are not matching.

5. The information processing apparatus according to claim 1, wherein the control unit does not permit remote driving of the remotely driven vehicle by the remotely driving apparatus if the state of equipment of the remotely driving apparatus is not matching the state of equipment of the remotely driven vehicle.

6. The information processing apparatus according to claim 1, comprising a warning generating unit that issues a warning if the state of equipment of the remotely driving apparatus is judged as not matching the state of equipment of the remotely driven vehicle.

7. The information processing apparatus according to claim 6, wherein the warning generating unit transmits warning information indicating that the state of equipment of the remotely driving apparatus is not matching the state of equipment of the remotely driven vehicle, to at least one of the remotely driving apparatus and a communication terminal corresponding to a remote driver to remotely drive the remotely driven vehicle using the remotely driving apparatus.

8. The information processing apparatus according to claim 7, wherein the warning generating unit transmits, to at least one of the remotely driving apparatus and the communication terminal of the remote driver, warning information that enables identification of a piece of equipment which is included in a plurality of pieces of equipment of the remotely driving apparatus and a state of which is not matching the state of equipment of the remotely driven vehicle.

9. The information processing apparatus according to claim 7, wherein the warning generating unit transmits, to at least one of the remotely driving apparatus and the communication terminal of the remote driver, warning information including a content of manipulation necessary for making the state of equipment of the remotely driving apparatus match the state of equipment of the remotely driven vehicle.

10. The information processing apparatus according to claim 9, wherein if a steering angle of steering of the remotely driving apparatus is not matching a steering angle of steering of the remotely driven vehicle, the warning generating unit transmits, to at least one of the remotely driving apparatus and the communication terminal of the remote driver, the warning information including a rotation amount and a rotation direction of a wheel that are necessary for making the steering angle of the steering of the remotely driving apparatus match the steering angle of the steering of the remotely driven vehicle.

11. The information processing apparatus according to claim 1, wherein
the first equipment state information indicates a physical state of the equipment of the remotely driven vehicle, and
the second equipment state information indicates a physical state of the equipment of the remotely driving apparatus.

12. The information processing apparatus according to claim 11, wherein
the first equipment state information indicates a position of a shift lever of the remotely driven vehicle, and
the second equipment state information indicates a position of a shift lever of the remotely driving apparatus.

13. The information processing apparatus according to claim 11, wherein
the first equipment state information indicates a steering angle of steering of the remotely driven vehicle, and
the second equipment state information indicates a steering angle of steering of the remotely driving apparatus.

14. The information processing apparatus according to claim 1, wherein the remotely driving apparatus is a car with a remote driving function to remotely drive the remotely driven vehicle.

15. A non-transitory computer readable storage medium having stored thereon a program to cause a computer to function as:
a first equipment state information acquiring unit that acquires first equipment state information indicating a state of equipment of a remotely driven vehicle which is to be remotely driven; and
a control unit that controls a remotely driving apparatus that is to remotely drive the remotely driven vehicle, the control being performed based on the first equipment state information and second equipment state information indicating a state of equipment of the remotely driving apparatus, wherein
the control unit judges whether or not a state of predetermined equipment included in the equipment of the remotely driving apparatus is matching the state of equipment of the remotely driven vehicle.

* * * * *